Aug. 16, 1966 J. L. WATERS 3,266,780
LIQUID BLENDING SYSTEM

Filed Aug. 19, 1964 3 Sheets-Sheet 2

INVENTOR.
JAMES L. WATERS
BY
*Blair & Buckles*
ATTORNEYS

Aug. 16, 1966    J. L. WATERS    3,266,780
LIQUID BLENDING SYSTEM
Filed Aug. 19, 1964    3 Sheets-Sheet 3

INVENTOR.
JAMES L. WATERS
BY
*Blair & Buckles*
ATTORNEYS

United States Patent Office 3,266,780
Patented August 16, 1966

3,266,780
LIQUID BLENDING SYSTEM
James L. Waters, Framingham, Mass., assignor to Waters Associates Inc., Framingham, Mass.
Filed Aug. 19, 1964, Ser. No. 390,639
8 Claims. (Cl. 259—4)

This invention relates to a continuous liquid blending system and to an improved in-line mixer for use therein. More specifically, it relates to a blending system capable of thoroughly mixing a plurality of liquids to form a product-mix having a particular composition. By detecting variations in the mix it controls the flow of the incoming liquid components to maintain the proper mix composition.

The blending system has particular application in the carbonated beverage industry in blending syrup concentrate and water to obtain a product-mix having a selected proportion of ingredients and my blending system will be described with that end in view. It will be appreciated, however, that the system can be used to obtain desired mixtures of other constituents.

Prior apparatus for mixing or blending syrup and water usually controls the ratio of ingredients of the blend by utilizing the flow rate of one liquid to regulate the flow of other liquid. For example, in one device one liquid is made to operate a fixed displacement pump for the other liquid. Another apparatus employs a pair of flow meters in the two liquid input lines, with a gear linkage between them to produce a differential output. The output is used to operate a control valve in one of the liquid lines.

The main trouble with the aforementioned systems is that they mix the syrup and water components solely on a volume basis. Accordingly, they are completely insensitive to changes in the concentration of the syrup. As a result, the product-mix frequently has the wrong concentration; the sugar content is either too high or too low. Further, in the prior systems the liquid components may not be adequately mixed prior to entering the carbocooler, a unit that coils and carbonates the product mix just prior to the filling operation. This can contribute to an uneven composition of the resultant product.

One proposed liquid process control system makes use of an analyzer which analyzes the product-mix and provides an electrical output signal corresponding to the actual proportion of ingredients. This signal is compared in a recorder with an adjustable set point or reference therein and the resulting error signal controls a valve in one of the liquid input lines. The valve appropriately regulates the flow of that liquid to reduce the difference between the desired and actual product-mix.

Even these systems have not been entirely satisfactory, however, for blending a plurality of liquids, particularly if they have widely different viscosities, because the liquids are not thoroughly mixed prior to being analyzed. As a result, transient and localized concentrations of one liquid or the other are "seen" by the analyzer as changes in the blend. False error signals can thus be fed to the control valve, causing an improper mixing ratio of the incoming liquid components and an improper concentration of the final product.

To provide a more uniform mixture for the analyzer, one might first feed the syrup and water into a mixing tank for stirring. However, this will cause excessive delay between a deviation from the desired mix and the subsequent sensing of the mix by the analyzer. By the time the incoming mix is back to normal, a large volume of off-quality product will have been produced. Even if the product is then passed through a large tank to "average out" variations in the mix, there may be an undue lack of uniformity in the mixture unless an inordinately large tank is used for this purpose.

It is important to have an appreciation of the times involved here. A delay of even three seconds between the sensing and regulating steps can be too great. In that short interval of time a large volume of off-quality mix may be fed to the carbocooler, with undersirably large changes in the composition of the product-mix being delivered to the filling machine.

Accordingly, this invention aims to provide a continuous liquid blending system which controls the product-mix in accordance with a commanded ratio of the ingredients thereof.

A further object of this invention is to provide a compact liquid blending system which maintains extremely accurate control over the ratio of ingredients of the mixture regardless of the concentration of the individual liquid components.

A further object of this invention is to provide a liquid mixing apparatus which immediately detects deviations from the desired mixing ratio and which very quickly restores the proper ratio, thereby minimizing off-quality production.

A still further object of this invention is to provide a liquid blending system which thoroughly mixes the incoming liquids in an efficient, small volume, high flow rate mixer prior to analyzing the blend.

Another object of this invention is to provide a large capacity in-line mixer for use in my liquid blending system which continually, yet thoroughly mixes a plurality of liquids without any external means of agitation.

Still another object of this invention is to provide a liquid mixer whose design inhibits the buildup of deposits within the mixer.

A more specific object of this invention is to provide a liquid mixer which is substantially self cleaning, yet all of whose interior parts are readily accessible for thorough cleaning if that becomes necessary.

Other objects of the invention will in part be obvious and will in part appear hereinafter.

The invention accordingly comprises the features of construction, combinations of elements and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

In general, my apparatus is connected to a source of two or more liquids, for example, syrup and water. The liquids are pumped in a predetermined volume ratio through a small volume, high flow rate in-line mixer which thoroughly mixes them. The flow of one liquid, e.g. water, into the mixer is regulated by a control valve in the water line. The liquid mix is then piped through an analyzer such as a refractometer on its way to the filling machine or other associated apparatus. The refractometer continuously monitors the product-mix. If the mix departs from a predetermined syrup concentration, the refractometer detects the change and a resulting error signal repositions the control valve to regain the proper syrup-water mix.

My system is responsive not only to changes in flow rates of the individual liquids, but also to changes in the concentrations of the liquid components; either of these factors could produce a mixture having an improper ratio of ingredients. Also, the system minimizes the waste problem because it responds extremely rapidly to changes in the ratio of ingredients. This is due principally to the improved mixer which it employs. The mixer blends the liquids extremely thoroughly and efficiently. Yet its small volume and high flow rate result in a delay of only one second between a deviation of the mix from the commanded concentration and the corrective repositioning of the control valve.

Despite its small size and high efficiency, the mixer has no moving parts and requires very little maintenance. It is self cleaning; yet when necessary, may be disassembled very quickly and easily to gain access to all interior surfaces.

Figure 1:
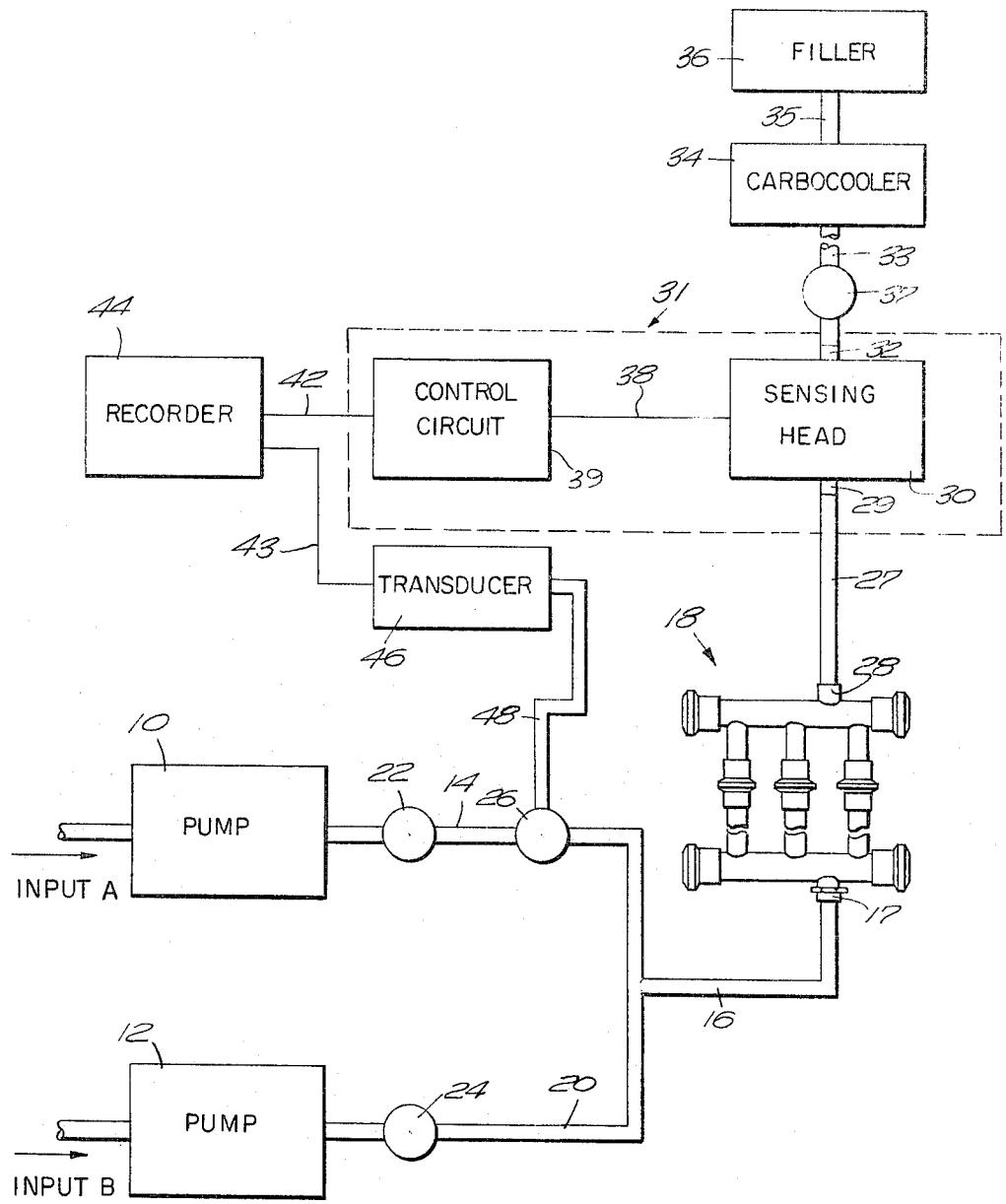
FIG. 1 is a block diagram of the principal elements of my liquid blending system.

Refer now more particularly to FIG. 1 of the drawing, which shows the elements of my system adapted to dispense a carbonated beverage comprising a blend of two liquids, syrup and water. The system comprises a pump 10 connected to a source of water (not shown), and a pump 12 connected to a source of syrup (not shown). The pump 10 may represent the public water supply; the pump 12 is preferably a positive displacement pump such as a gear pump, to provide consistent delivery of the more viscous syrup.

Pump 10 is connected by means of a tube 14 and common tube 16 to the inlet 17 of a mixer indicated generally at 18, to be described more particularly later. Pumy 12 is similarly connected by means of a tube 20 and the common tube 16 to the mixer inlet 17. A pair of check valves 22, 24 are installed in tubes 14 and 20 respectively to prevent back flow of liquid from one tube to the other. Also, a fluid operated control valve 26 is located in the water line.

A sanitary tube 27 is connected between the outlet 28 of mixer 18 and the inlet 29 of the sensing head 30 of a liquid refractometer indicated generally at 31. The outlet 32 of sensing head 30 is connected via sanitary tube 33 to the usual carbocooler 34. The carbocooler cools and carbonates the liquid mix flowing through it prior to delivery of the mix via sanitary tube 35 to a conventional filling machine 36. A check valve 37 is installed in tube 33 to prevent back flow of pressurized liquid from the carbocooler to the sensing head 30.

As the liquid mix flows through the sensing head 30 to the carbocooler 34, its refractive index is sensed. The index is indicative of the concentration of ingredients in mixture entering inlet 29. An electrical signal corresponding to the refractive index is developed and fed through a lead 38 to a control circuit 39 and from there to a recorder 44 by way of a lead 42. The recorder 44 is a conventional unit of the type having an adjustable set point. With a given value of the set point, say, 10 Brix, a finite difference or error signal appears at the output lead 43 of recorder 44 whenever the head 30 detects a mix concentration which varies from the set point.

The liquid refractometer 31 preferably has a fast response to changes in the refractive index of the liquid entering inlet 29 and is capable of continuous sampling. A suitable refractometer is described in Honeywell Instrumentation Data Sheet No. 10–16–32, entitled "Waters In-line Refractometer."

The recorder 44 gives a visual indication of the concentration and, if desired, it may also include an overrride switch (not shown) which can be used to actuate an alarm or even to automatically stop the pumps 10, 12 when an out-of-tolerance mix is detected by the refractometer 31.

The difference signal from recorder 44 is fed to a transducer 46. Transducer 46 has a hydraulic or pneumatic output connected through a conduit 48 to the fluid operated control valve 26 mentioned previously.

As long as the product-mix flowing through sensing head 30 has the required composition, as set by reference 40, no difference signal will be sent to transducer 46. The water and syrup are then supplied and mixed in the ratio of approximately 4:1, the desirable mixture for such beverages.

When, however, the strength of the finished syrup is too low, the refractometer 31 detects the low sugar concentration in the product-mix and the control circuit 39 sends a difference signal to transducer 46. This actuates valve 26 to reduce the water flow by the amount required to restore the proper mix composition. Conversely, when the strength of the syrup is too high, a corresponding difference signal from the circuit 39 causes the valve 26 to open further. This increases the water flow sufficiently to compensate for low syrup strength.

As a feature of this invention, the product-mix is thoroughly blended before being analyzed by refractometer 31. Thus, the refractometer is not "misled" by transient and localized concentrations of one liquid or the other. This is made possible by the unique mixer 18.

In general, mixer 18 employs a plurality of relatively small diameter, elongated mixing chambers. A baffle assembly is positioned within each mixing chamber. The liquid constituents from pumps 10 and 12 are caused to flow into one end of the chamber and are constrained to follow a sinuous or zigzag course through the chamber to the other end of the chamber for delivery to the refractometer 31. On their zigzag course through the mixer, the liquid constituents are thoroughly agitated and mixed together so that by the time they leave the chamber they are completely blended. Thus, subsequent false signals from refractometer 31 due to localized concentrations of liquid constituents are practically impossible.

Mixer 18 has a relatively small mixing volume, yet it is able to mix a plurality of liquids rapidly and without any external means of agitation. Still the chamber is very efficient, and, it presents no cleaning or maintenance problems.

Figure 3:
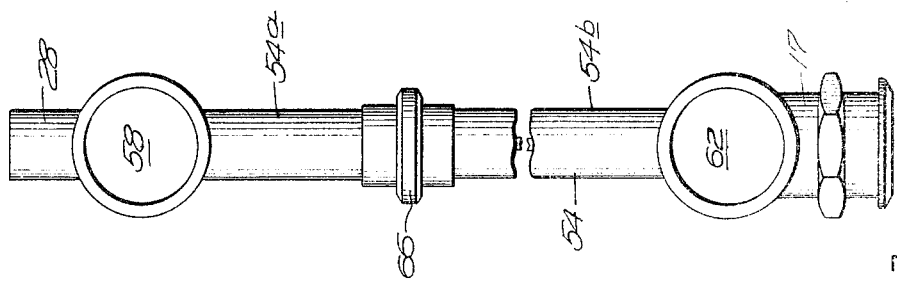
FIG. 3 is an end view of the mixer chamber of FIG. 2.
Figure 2:
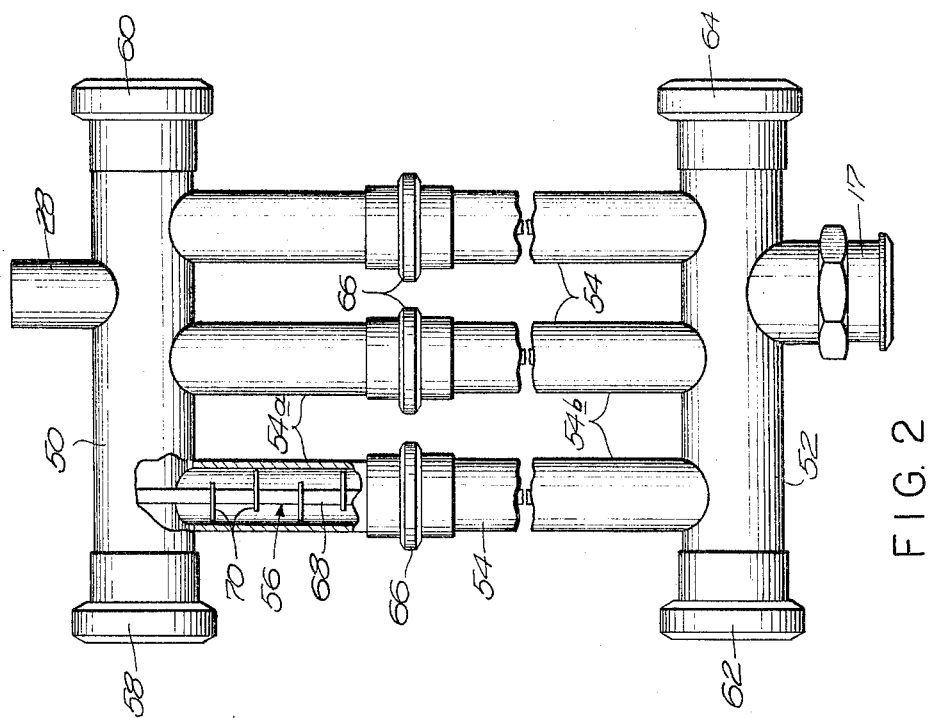
FIG. 2 is a side view, partly cut away, of the mixer chamber of FIG. 1.

Refer now to FIGS. 2 and 3 which show the mixer 18 in greater detail. It is seen to comprise a pair of upper and lower horizontally disposed manifolds 50 and 52, respectively. A plurality of similar, spaced-apart, parallel pipes 54 extend vertically between the manifolds 50 and 52 and their bores communicate with the interiors of the manifolds. Baffle assemblies indicated generally at 56 are loosely positioned in pipes 54.

The aforementioned inlet 17 of mixer 18 communicates with the interior of the lower manifold 52. The mixer outlet 28, on the other hand, communicates with upper manifold 50 and is positioned above the inlet 17. Preferably, the inlet 17 and outlet 28 are both disposed between two adjacent pipes 54 so as not to lie opposite baffle assemblies 56. The opposite ends of upper manifold 50 are closed by removable end caps 58 and 60. Similar removable caps 62 and 64 seal the two ends of the lower manifold 52.

To facilitate disassembly of the chamber 18 for cleaning, each pipe 54 comprises separable upper and lower sections 54a and 54b respectively which butt, and are removably secured together by means of clamps 66.

Figure 4:
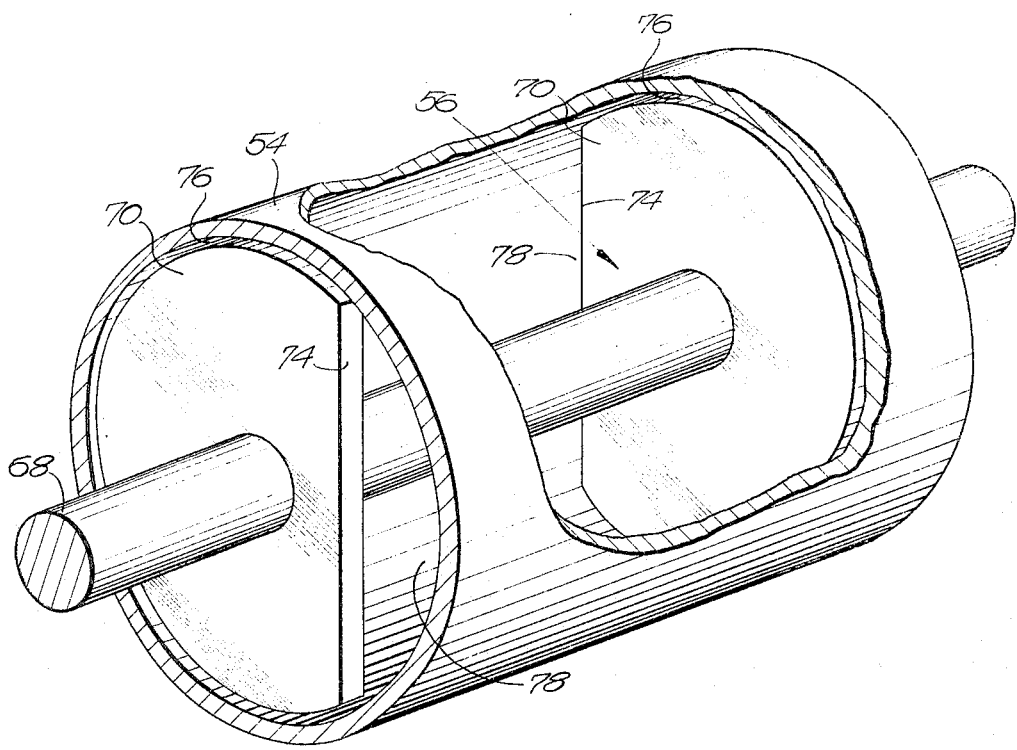
FIG. 4 is an enlarged perspective view, partly cut away, of a portion of the mixer of FIGS. 2 and 3.

Referring now to FIGS. 2 and 4, the baffle assemblies 56 each comprise a small diameter shaft 68 which extends from the upper wall of manifold 50 to the lower wall of manifold 52. The shafts 68 have no appreciable lengthwise play within the respective pipes 54. A series of baffle plates 70 are mounted in axial alignment on each shaft 68. The first plate of each series is located near the upper end of a pipe 54 and the last plate near the lower end thereof. Preferably, the intermediate plates 70 are spaced apart on the shaft a distance approximately equal to one half the pipe 54 interior diameter.

Each baffle plate 70 is shaped in the form of a zone of a circle having only one straight side 74. As such, it is somewhat more than a half circle. The diameter of each plate 70 is slightly less than the inside diameter of the corresponding pipe 54 so that there exists a small gap 76 between the round edge of each plate 70 and the wall of its pipe 54. In addition, the plates 70 of each series are oriented on their shaft 68 so that the straight edges 74 of adjacent plates are positioned on opposite sides of the shaft. Accordingly, the plates 70 of each series form together a staggered passage 78 running from one end of a pipe 54 to the other and defining a sinuous or zigzag course through the pipe. Although the baffle assemblies 56 do not move lengthwise to any appreciable extent within pipes 54, the relative diameters of the plates 70 and pipes 54 do permit the assemblies to wobble laterally somewhat within the pipes.

As the water and syrup concentrate are pumped through pipe 17 into mixing chamber 18, they are forced up through the pipes 54. In each pipe, by far the larger amount of liquid is constrained to flow through the passage 78 at the first baffle plate 70. The liquid roils and swirls in the space between the two plates as it finds its way to the passage 78 in the second plate 70 at the opposite side of pipe 54. Eddies in that space agitate and mix the two liquid components.

At the same time, a relatively small portion of the liquid flows in streams around the curved edge of plate 70 through gap 76. These larger and smaller liquid streams intersect in the space between the two plates, creating additional eddies which agitate and mix the liquid components. This same agitating and mixing action occurs between each pair of adjacent plates 70 all along the pipe 54. Thus, by the time the liquid reaches the upper manifold 50 prior to exiting chamber 18, its components are completely and thoroughly blended. Mixing efficiency ratings as high as 99% have been obtained with my system for flow rates as low as five gallons per minute and even as high as 50 gallons per minute in a unit employing twelve plates 70 in each pipe 54, with the pipes 54 being approximately 26 inches long and 1⅞ inches in interior diameter. The plates 70 had a diameter of 1 13/16 inches in this example.

It is important to appreciate here that the mixing chamber 18 accomplishes thorough mixing of the liquid components in a relatively short length and with a small mixing volume as compared with prior comparable mixers. Accordingly, the distance between the control valve 26 and the sensing head 30 is short. As a result, there is extremely fast response by the servo system to changes in the composition of the mix. In the illustrated embodiment of my invention, the time lag between the response of control valve 26 and sensing by refractometer 31 is very short, on the order of one second. Still, the system produces no spurious or incorrect signals due to unevenly blended product-mix.

It will be noted that the mixing chamber 18 contains no corners or joints between the plates 70 and the inside walls of pipes 54 as would tend to accumulate deposits of food matter. Moreover, the plates 70 can be mounted on shaft 68 while the baffle assembly 56 is outside its pipe 54. As a result the welded or brazed joints between the plates and the shaft can be thoroughly polished to minimize the subsequent accumulation of food deposits at the joints.

Also, during the mixing operation liquid flows constantly and at high velocity through the openings 76 and 78 between the plates 70 and the pipes 54 continually scouring the edges of the plates 70 and the inside walls of the pipes. Still further, the liquid streams and eddies cause the baffle assemblies 56 to wobble within their respective pipes 54 shaking loose any deposits starting to form on the shafts 68 or the plates 70.

As a result of the foregoing, my mixing chamber remains clean for extremely long periods of time as compared with prior similar devices and requires very little maintenance. Also, there are no moving parts such as would require preventative or corrective maintenance. When it is necessary to clean the interior of the mixing chamber 18, however, this is done quickly and easily simply by removing the clamps 66 and separating the pipe sections 54a and 54b. Then baffle assemblies 56 are removed from their pipes whereupon all their surfaces are exposed for scrubbing. The pipe sections 54a and 54b, on the other hand, have no interior corners or projections, so they can be cleaned very quickly by simply reaming them with a brush. Likewise, the interiors of manifolds 50 and 52, which have no interior corners or joints are cleaned by removing the end caps 58–64 and running brushes through them.

It will be seen from the foregoing then that my improved liquid blending system thoroughly mixes and blends individual liquid components into a thoroughly blended product-mix prior to analyzing the mix for purposes of controlling the ratio of ingredients of the mix. The mixing is accomplished in a relatively small in-line mixer having a high flow rate. The mixer itself is self-contained, requiring no exterior means for agitating the liquid. Moreover, the mixer is substantially self-cleaning, yet may be readily disassembled to gain access to all internal surfaces and parts.

With my system, when the ratio of ingredients of the mix departs from a selected set point, the system very quickly regulates the flow of one or more of the liquids to compensate for the deviation and restore the proper composition before any appreciable quantity of off-quality mix is delivered to the carbocooler. Although I have described a blending system suitable for mixing two liquids in the beverage field, it will be appreciated that the principles stated herein are applicable to systems for blending any three or even four or more fluids.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to be secured by Letters Patent is:

1. A mixer for mixing beverage components prior to analysis comprising upper and lower manifolds, a plurality of elongated pipes, each of said pipes having a bore extending between and communicating with said manifolds, a shaft removably positioned within each of said pipes and extending longitudinally therein, a series of similar baffle plates mounted in spaced axial alignment on each of said shafts and supported thereby, said baffle plates each being smaller than said pipe bore and having one edge portion conforming generally to said bore, said baffle plates each having another edge portion spaced appreciably from the wall of said pipe, the other edge portions of adjacent ones of said plates being positioned on opposite sides of said shaft, thereby forming a series of passages between said edge portions and said pipe wall defining a zigzag course through said pipe.

2. The combination defined in claim 1 in which each of said baffle plates has the shape of a zone of a circle with said other edge portion thereof being a straight side of said zone.

3. A mixer for mixing beverage components prior to analysis comprising a hollow tube and a baffle assembly removably positioned within said tube, said baffle assembly comprising a relatively small diameter shaft and a series of baffle plates mounted in spaced axial alignment on said shaft, each of said plates having a major curved edge portion in general conformance with but slightly smaller than said tube bore, each of said plates also having a minor straight edge portion, the straight edge portions of adjacent ones of said plates being spaced apart an appreciable distance laterally from one another on opposite sides of said shaft defining a series of staggered relatively large area passages along said tube, the relative dimensions of said plates, shaft and tube permitting appreciable wobbling movement of said baffle assembly within said tube.

4. A mixer for mixing beverage components prior to analysis comprising upper and lower manifolds, a plurality of hollow tubes extending between and communicating with said manifolds, each of said tubes having a baffle assembly removably positioned within it, said baffle assembly comprising a relatively small diameter shaft and a series of baffle plates mounted in spaced axial alignment on said shaft, each of said plates having a major curved edge portion in general conformance with but slightly smaller than said tube bore, each of said plates also having a minor straight edge portion, the straight edge portions of adjacent ones of said plates being disposed on opposite sides of said shaft, the relative dimensions of said plates, shaft and tube permitting appreciable wobbling of said baffle assembly within said tube.

5. A mixer for mixing beverage components prior to analysis comprising upper and lower tubular manifolds, said manifolds having removable caps at their opposite ends, one of said manifolds having an inlet, the other of said manifolds having an outlet, a plurality of elongated tubes, said tubes having bores extending between and communicating with said manifolds, each of said tubes consisting of separable sections, a baffle assembly removably positioned within each tube, said baffle assembly comprising a shaft running along the entire length of said tube and extending to the manifold wall portions lying opposite said tube bore, a series of spaced apart baffle plates mounted on and supported by said shaft within said tube, each baffle plate having one curved edge portion generally conforming to but somewhat smaller than said tube bore, each plate also having another straight edge portion spaced from the tube wall, the straight edge portions of adjacent plates being situated on opposite sides of said shaft, thereby forming passages between said straight edge portions and the tube wall by which the major portion of said liquid flowing into one of said manifolds is constrained to follow a zigzag course through said tube to the other of said manifolds while the minor portion of said liquid flows around the curved edge portions of said plates.

6. A mixer for mixing beverage components prior to analysis comprising an elongated tube, means forming end walls opposite the ends of said tube, said tube consisting of longitudinally separable sections, a baffle assembly removably positioned within said tube, said baffle assembly comprising a shaft running along the entire length of said tube and extending to said wall portions, a series of spaced apart baffle plates mounted on and supported by said shaft within said tube, each baffle plate having one curved edge portion generally conforming to but somewhat smaller than the bore of said tube, each plate also having another straight edge portion spaced from said tube wall, the straight edge portions of adjacent plates being spaced apart an appreciable distance laterally from one another on opposite sides of said shaft, thereby forming a series of staggered relatively large area passages between said straight edge portions and the tube wall by which the major portion of said liquid flowing into one end of said tube is constrained to follow a zigzag course through said tube to the other end thereof while the minor portion of said liquid flows around the curved edge portions of said plates.

7. A liquid blending system comprising a first source of liquid, a second source of liquid, a liquid analyzer, a mixer connected between said sources and said analyzer, said mixer comprising a plurality of elongated pipes, a shaft removably positioned with each of said pipes, a series of similar baffle plates mounted in spaced axial alignment on each of said shafts, each plate of said series having a major portion conforming to the interior of said pipe and a minor non-conforming portion, said non-conforming portions of adjacent plates of said series being situated on opposite sides of said shaft thereby defining a sinuous course through said pipe, and means responsive to said analyzer for regulating the flow of liquid into said mixer.

8. A liquid blending system for blending beverage components in a predetermined ratio prior to the filling operation comprising a first source of liquid, a second source of liquid, at least one of said sources including means for regulating liquid flow, a liquid analyzer having an outlet and an inlet, said outlet being adapted to communicate with a beverage filler, a mixer connected between said sources and said inlet, said mixer comprising a housing defining a small volume chamber, baffle means loosely positioned within said chamber, said baffle means constraining said liquids to flow on a zigzag course within said chamber whereby said liquids are violently agitated and mixed prior to reaching said analyzer inlet, said analyzer analyzing the blended liquids flowing through said inlet, error signal means responsive to said analyzer and developing an error signal indicative of the deviation of the composition of said blended liquids from a reference value, control means connected between said error signal means and said regulating means, said control means actuating said regulating means to diminish said error signal.

References Cited by the Examiner
UNITED STATES PATENTS

| | | | |
|---|---|---|---|
| 1,626,487 | 4/1927 | Warren | 259—4 |
| 2,868,216 | 1/1959 | Robertson | 137—93 |
| 3,008,808 | 11/1961 | Hodges | 259—4 |
| 3,045,984 | 7/1962 | Cochran | 259—4 |
| 3,124,148 | 3/1964 | Kleiss et al. | 137—93 |

WALTER A. SCHEEL, *Primary Examiner.*

IRVING BUNEVICH, *Examiner.*

ROBERT W. JENKINS, *Assistant Examiner.*